Patented Jan. 10, 1939

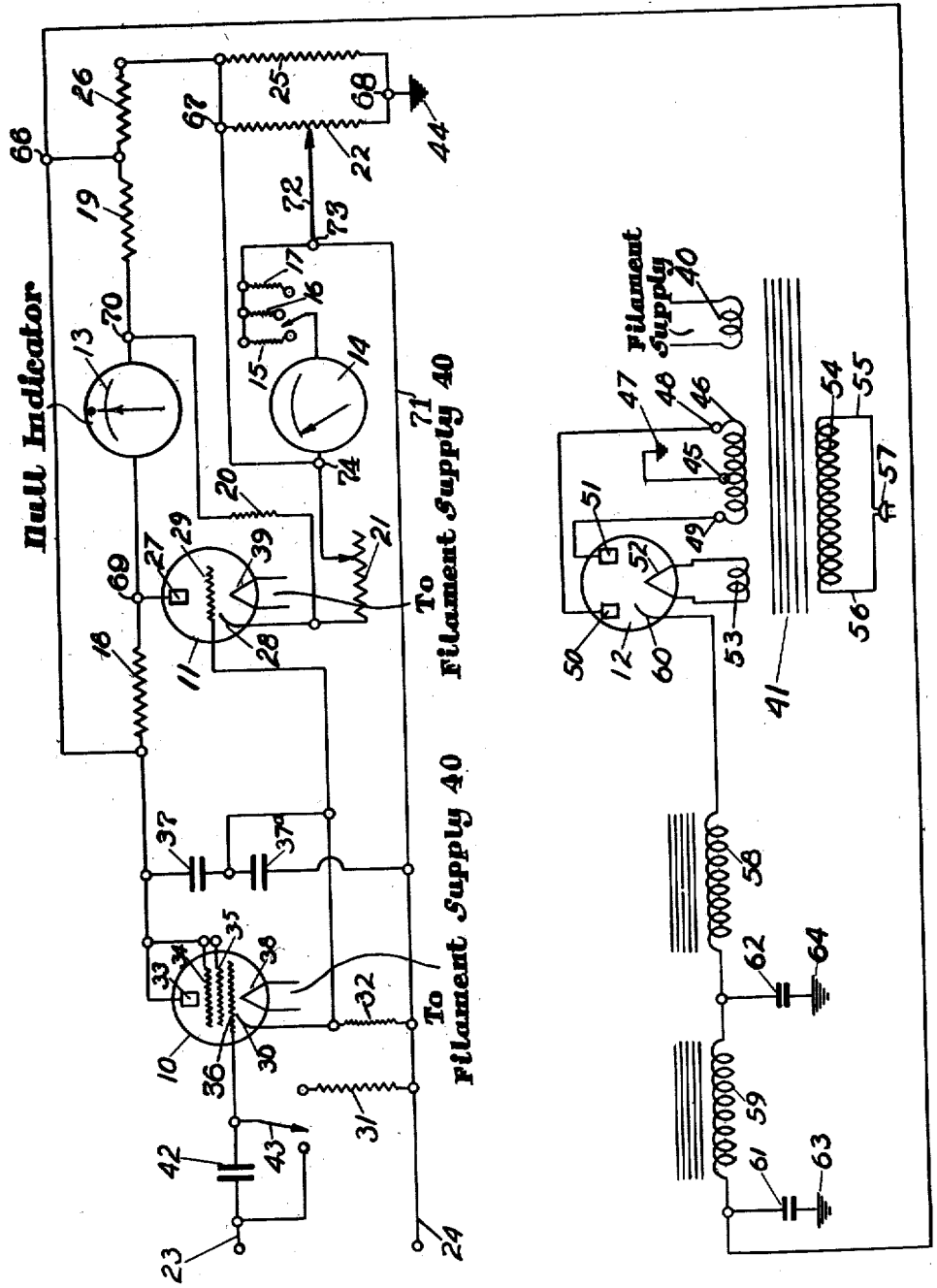

2,143,219

UNITED STATES PATENT OFFICE 2,143,219

VACUUM TUBE VOLTMETER CIRCUIT

Floyd E. Wenger, Bluffton, Ohio, assignor to Ray E. Triplett, Bluffton, Ohio

Application July 2, 1936, Serial No. 88,631

6 Claims. (Cl. 171—95)

This invention relates to electrical measuring instruments, and in particular, to a bridge type instrument employing vacuum tubes.

One object of this invention is to provide a vacuum tube bridge type measuring instrument, wherein a grid-controlled tube forms the fourth arm of a Wheatstone bridge, the action of this tube being governed by a grid-controlled input tube in the input circuit.

Another object is to provide a vacuum tube bridge type measuring instrument, wherein the meter employed is provided with a linear scale instead of a current squared scale.

Another object is to provide a vacuum tube bridge type measuring instrument, wherein the tubes are not required to be previously calibrated, means being provided to automatically maintain the calibration of the tubes and the meter by a balancing out arrangement.

Another object is to provide a vacuum tube bridge type measuring instrument, wherein with current flowing on either side of zero of a galvanometer, the indicating means may be readily brought to the null point without the possibility of changing the input circuit balance.

Another object is to provide a bridge type vacuum tube measuring instrument, wherein the tube plate current is not permitted to reach the saturation point, thereby upsetting the linear characteristics of the meter scale. Stability is obtained and frequency discrimination minimized by proper shielding and by biasing the input tube to or in excess of the tube plate current cut-off value.

The drawing shows one circuit embodying the vacuum tube bridge type measuring instrument of this invention.

In general, the vacuum tube type measuring instrument of this invention consists of a Wheatstone bridge circuit in which a vacuum tube is made the fourth arm of the bridge, and a resistor is associated therewith to vary the tube resistance in order to bring the bridge circuit into balance. Associated with the bridge vacuum tube is a grid-controlled input tube which receives the input current upon its grid, and correspondingly changes the plate current flowing through the bridge circuit. A potentiometer associated with the bridge circuit provides a means for balancing out the input current after the bridge has been previously brought to balance by means of a null-indicating instrument, such as a galvanometer or a head 'phone.

The present invention is shown as embodied in a vacuum tube voltmeter, but it is understood that this arrangement of using a vacuum tube as the fourth arm of a Wheatstone bridge may be applied to other testing equipment, such as to tube testers or to capacity and impedance testers. It will also be understood that the invention is not limited to the particular types of tubes shown in the circuit, as it is apparent to those skilled in the art that any grid-controlled vacuum tube may be used in the Wheatstone bridge arm, and that other types of vacuum tubes may be substituted for the tube employed in the input circuit. The null indicator may also be any suitable instrument for indicating when the current flowing through the bridge circuit is in balance.

Hitherto the vacuum tube voltmeter has enabled the measurement of voltages in circuits where the commoner forms of voltmeters would draw so much current and so disturb the conditions as to give an erroneous or misleading reading. Such instruments have been particularly used for measuring voltages at radio frequencies because other types of instruments, such as either electro-static voltmeters or thermal instruments employing a thermo-couple and a direct current meter, draw so much current that they affect the voltage under measurement. Previous types of vacuum tube voltmeters, however, have operated in such a manner that the change in plate current, resulting from an input alternating current voltage impressed upon the input circuit, increases as the square of the alternating current grid voltage for low voltages, and only approaches a linear relationship for high negative grid voltages, hence, requiring an experimentally obtained calibration curve for aid in choosing the proper voltages. This also required substantially a current squared scale on the measuring instrument, thus leading to difficulty in reading the instrument.

Previous vacuum tube type voltmeters have also exhibited lack of stability and frequency discrimination, and have also required the use of a voltage divider or a meter shunt to multiply the initial scale, this voltage divider drawing current from the source of measurement. Under these circumstances, the saturation point of the tube is reached and the current squared scale becomes more crowded. In such instruments the tubes must also be individually calibrated, or mechanical or electrical means provided in the circuit to calibrate the meter scale, and this calibration must be performed rather frequently. Ordinarily, the operator must return the instrument to the manufacturer for calibration at frequent intervals.

Another defect of prior vacuum tube voltmeters employing the slide back balancing out method is that the setting may be brought to zero with no possible chance of bringing the circuit in balance from the opposite side of zero without requiring extreme care. In the vacuum tube measuring instrument of the present invention, stability is obtained and frequency discrimination minimized by proper shielding and by biasing the input tube to or in excess of the tube plate current cut-off value. A linear scale is also obtained by the present circuit, thereby facilitating the obtaining of readings, as contrasted with the difficulties encountered upon the use of the current squared scales of previous instruments.

The circuit of the present invention also results in a minimum of current being drawn from the source of measurement, and the tube plate current does not reach a saturation point. The tubes in the circuit of the present invention, moreover, are not required to be calibrated because a balancing out arrangement is provided which automatically maintains the calibration. Errors of measurement are kept to a minimum because with current flowing on either side of zero, the indicating means may readily be brought to the null point without the possibility of changing the circuit balance. The circuit of the present invention provides for the measurement of R. M. S. (square root of mean square), peak and direct current voltages as applied upon the input part of the circuit shown to the left of the drawing. The scale reading on the measuring instrument corresponds to a definite R. M. S. value in volts impressed upon the grid of the input tube.

Referring to the drawing in detail, the input part of the circuit is shown in the upper left-hand portion of the drawing, the bridge part thereof in the upper right-hand portion of the drawing, and the power supply part of the circuit in the lower portion thereof. The input side of the circuit therein shown contains a grid-controlled input tube, generally designated 10, and of the type referred to in the art as type 6C6. The Wheatstone bridge portion of the circuit contains a vacuum tube 11, of the type known in the art as type '37. The power supply part of the circuit contains a vacuum tube 12, known in the art as a type '84 tube. Also associated with the bridge portion of the circuit is a null indicator 13, which may be a galvanometer, a sensitive head 'phone or any other suitable type of indicator. Associated with the bridge portion of the circuit is a linear scale meter 14 for measuring the balancing out voltage, this meter being a conventional multi-range meter with the resistances 15, 16 and 17 associated therewith for use with different scale ranges.

The bridge portion also contains the fixed resistors 18, 19 and 20, forming three arms of the Wheatstone bridge, of which the tube resistance of the vacuum tube 11 forms the fourth arm. The tube resistance is adjusted by means of a variable grid bias resistor 21 associated with the vacuum tube 11. By varying the setting of this variable grid bias resistor 21 the tube resistance of the vacuum tube 11 may be varied in order to bring the bridge circuit into balance, this balance being indicated by the zero position of the null indicator 13, as evidenced by a zero deflection of the galvanometer or an absence of sound in the sensitive head 'phone, optionally used.

Associated with the bridge portion also is a potentiometer 22, by means of which a variable neutralizing voltage may be applied to the input portion of the circuit in order to balance out the voltage under test, this voltage being indicated upon the meter 14. In the circuit shown in the drawing it will be understood that the current supplied from the potentiometer 22 and indicated on the linear scale meter 14, is equal to the voltage impressed upon the input terminals 23 and 24. Also associated with the bridge portion of the circuit are the fixed resistors 25 and 26, used to furnish the actuating voltage, the resistor 26 furnishing to the bridge and resistor 25 the balancing out voltage.

The plate 27 of the bridge tube 11 is connected to the line joining the fixed arm resistor 18 and the null indicator 13. The heated cathode element 28 of the tube 11 is connected to the junction of the lines from the variable grid bias resistor 21 and fixed arm resistor 20. The grid 29 of the bridge tube 11 is connected to the cathode 30 of the input tube 10. Fixed grid stabilizing and bias resistors 31 and 32, respectively, are also provided for the tube 10. The plate 33 and the grids 34 and 35 of the input tube 10 are connected together to make a high-mu triode of tube 10, their junction being connected to the opposite side of the fixed arm resistor 18 from the connection of the plate 27 of the bridge tube 11. The remaining grid 36 of the input tube 10 is connected to the input terminal 23 by way of the fixed condenser 42. Arranged between the part of the circuit leading from the plate 33 and the cathode 30 to the bridge part of the circuit are the fixed condensers 37 and 37a. The filaments 38 and 39 of the tubes 10 and 11 are heated by means of current supplied from the filament supply secondary winding 40 of the power transformer 41, the interconnecting wiring being omitted to avoid unduly complicating the drawing with the filament wiring.

The input terminal 23 is provided with a fixed condenser 42 for the purpose of preventing any direct current which may be flowing in the external circuit from flowing to the grid 36 of the input tube 10 or through the grid resistor 31, depending upon the setting of the manual switch 43 arranged to short-circuit the opposite plates of the condenser 42 for measuring direct current. This condenser 42 also provides a path of low impedance for the input voltage if of an alternating current nature. The provision of the fixed condenser 42 also prevents any direct current from flowing into the input part of the circuit, and thereby disturbing the adjustment of the grid bias.

Current is supplied to the potentiometer 22 from the power supply transformer 41. For this purpose the potentiometer is grounded, as at 44, and the mid-terminal 45 of the secondary winding 46 of the transformer is also grounded, as at 47, the end terminals 48 and 49 being connected, respectively, to the plates 50 and 51 of the tube 12. The filament 52 of the tube 12 is heated by current from the filament secondary 53 of the transformer 41, the primary 54 of which is connected to the power current mains by the lines 55 and 56 leading to the wall plug 57. Chokes 58 and 59 are also provided in the circuit leading to the cathode 60 of the tube 12 and fixed condensers 61 and 62 are associated therewith, and grounded as at 63 and 64. This constitutes a brute force filter for the smoothing out of the rectified current.

In the operation of the circuit, the voltage is divided into two portions. The terminal 67 may be provided with approximately 60 volts positive, as compared with the negative terminal 68, and is used for the bucking-out voltage. The voltage between the terminals 67 and 66 may be approximately 45 volts and is used for the operation of the bridge. As the negative lead 24 is connected by the resistance 31 to the grid 36 of the input tube 10, this grid 36 may be placed at a negative potential equaling the cut-off value of the input tube 10. This negative potential is supplied by the drop in the resistor 32, which is connected from the cathode 30 of the input tube 10 to the negative connection 24. With the proper resistance in this resistor 32 a predetermined voltage is developed across the grid 29 and cathode 28 of the bridge tube 11. The three arms 18, 19, 20 of the Wheatstone bridge circuit constitute pure resistance, whereas the bridge tube 11 constitutes the variable arm of the Wheatstone bridge. The resistance of the bridge tube 11 is controlled by the potential upon the grid 29 thereof, and this in turn, is controlled by the drop in potential across the resistors 32 and 21.

To balance the instrument prior to its use for measuring purposes, the operator applies the proper voltage, such as 45 volts, across the terminals 66 and 67, these giving the positive and negative voltages for the operation of the bridge. An even division of current flows through the Wheatstone bridge circuit 18, 19, 20 when the resistance 21 is so adjusted that the bias of the bridge tube 11 allows the resistance of this tube to equal approximately 40,000 ohms. These values are, of course, solely for purposes of example, and will vary with different types of tubes.

With the current equally divided through each section of the Wheatstone bridge, no voltage drop occurs across the connections 69 and 70, between which the sensitive null indicator 13 is connected so that the latter reaches zero. When this connection is made it is also essential that the resistor 22 is set at zero voltage between the connections 67 and 68. With the potentiometer arm 72 set at the connection 67 a zero voltage drop occurs therebetween, this zero potential likewise occurring along the line 71 leading to the negative connection 24. The resistor 31 is placed in the position shown in order to have a conducting path for voltage reaching the grid 36 of the tube 10. When the leads 23 and 24 are interconnected, as during the taking of a measurement, a path is formed for the negative voltage, hence, the resistor 31 can be eliminated when it is desired to have a no-current draw meter.

With the bridge thus balanced, the operator applies either alternating current or direct current voltage across the leads 23 and 24 within the range of the instrument. This voltage will cause the grid 36 of the input tube 10 to become positive, thereby causing plate current to flow from the cathode 30 to the plate 33 of the input tube 10. Depending upon the characteristics of the input tube 10 and the amount of voltage applied to the leads 23 and 24, this plate current, thus flowing, will cause a voltage drop across the resistor 32, this voltage drop being impressed upon the grid 29 of the bridge tube 11. When the voltage of the grid 29 of the bridge tube 11 is thus changed, the resistance between the plate 27 and cathode 28 thereof is also changed, and causes an unbalanced current to flow in the Wheatstone bridge circuit 18, 19, 20. The resulting unbalanced condition of the Wheatstone bridge creates a voltage drop across the connections 69 and 70, and causes the needle of the null indicator 13 to move from its zero position. In order to bring this needle back to its zero position, the grid 29 of the bridge tube 11 must be placed at the exact voltage which it possessed when the bridge circuit was originally in balance with no voltage applied to the leads 23 and 24.

In order to obtain this result the arm 72 of the resistor 22 is adjusted toward the negative position 68 until the voltage, which is conducted through the lead 71 to the lead 24, and thence to the grid 36 of the input tube 10, reaches the same voltage as existed before the unknown voltages were applied to the leads 23 and 24. The current from the plate to the cathode thereby assumes any value desired within the range of the instrument, and causes the voltage drop across the resistor 32 to assume its original voltage, whereupon the grid 29 of the bridge tube 11 returns to its original voltage. When this occurs the resistance of the Wheatstone bridge circuit between the plate 27 and cathode 28 of the bridge tube 11 reaches the same value which it originally possessed, namely 40,000 ohms, as shown by the arm 20 of the bridge, which is given this value for purposes of the present example. The resistors 18 and 19 are given equal values of 6,000 ohms, under the same circumstances. When the bridge tube 11 assumes its normal current flow, there is an equal division of voltage between the null indicator connections 69 and 70, hence, no voltage drop occurs thereacross, and the needle of the null indicator 13 again returns to zero.

The meter 14 is connected from the negative connection 74 of the bridge circuit (which is also the positive connection for the balancing voltage from the terminal 67) to the connection 73 at the end of the arm 72 of the resistor 22. The lower terminal 68 of the resistor 22 is negative, while the upper terminal 67 is positive, as previously stated. Thus, the meter 14 indicates the voltage drop across the resistance 22, depending upon the position which the arm 72 takes when the voltage is applied to the leads 71 and 24, and thence to the grid 36 of the input tube 10. This causes the input tube 10 to assume the condition of plate-to-cathode current, for which the tube tester was designed. This voltage drop measured by the meter 14 across the resistance 22 is known as the bucking-out voltage, and is measured in volts when the meter 14 is calibrated in volts. The reading of the meter 14 then equals the voltage being measured across the leads 23 and 24.

Summarizing the operation of the circuit, therefore, the variable grid bias resistor 21 is adjusted until the resistance of the bridge tube 11 is such that the bridge circuit is completely in balance, as indicated by the null indicator 13. The provision of the variable grid bias resistor 21, therefore, compensates for variation in voltages and inequalities of tube calibration, and other variable factors of this nature. When input voltage is now applied to the grid of the input tube 10, the corresponding flow of plate current upsets the balance of the bridge part of the circuit. The operator now adjusts the potentiometer 22 so as to supply a neutralizing voltage which balances out the voltage under test. When this input voltage is balanced out the bridge portion of the circuit becomes balanced again, and no current flows therein. At this point the null indicator 13 again indicates zero current. The voltage impressed on the input is therefore equal to the balanced out voltage applied from the potentiometer 22 and is read by the operator directly on the linear scale meter 14.

Batteries may be used as a source of current supply, but I prefer to use rectified alternating current power supply, as shown.

It will be understood that I desire to comprehend within my invention such modifications as come within the scope of the claims and the invention.

Having thus fully described my invention, what I claim as new and desire to secure by Letters Patent, is:

1. In an electrical measuring instrument, a bridge circuit having resistance means including a vacuum tube connected to form one resistance arm of said bridge circuit, an input circuit including an input vacuum tube connected to said bridge circuit vacuum tube, a null indicator for indicating the state of balance of said bridge circuit, means for balancing said bridge circuit to balance the current being measured, and a meter for measuring the current supplied to the input circuit.

2. In an electrical measuring instrument, a bridge circuit having resistance means including a vacuum tube connected to form one resistance arm of said bridge circuit, an input circuit including an input vacuum tube having a grid arranged to receive the input current and a plate connected to said bridge circuit, a null indicator for indicating the state of balance of said bridge circuit, means for supplying current to the input circuit to balance the current being measured, and a meter for measuring the current supplied to said input circuit.

3. In an electrical measuring instrument, a bridge circuit having resistance means including a vacuum tube connected to form one resistance arm of said bridge circuit, an input circuit including an input grid-controlled vacuum tube having an electrode thereof connected to an electrode of said bridge circuit vacuum tube and another electrode connected to said bridge circuit, a null indicator for indicating the state of balance of said bridge circuit, means for supplying current to said input circuit to balance the current being measured, and a meter for measuring the current supplied to said input circuit.

4. In an electrical measuring instrument, a bridge circuit having resistance means including a vacuum tube connected to form one resistance arm of said bridge circuit, an input circuit including an input vacuum tube having a grid arranged to receive the input potential, a plate connected to said bridge circuit and a cathode connected to the grid of said bridge circuit vacuum tube, a null indicator for indicating the state of balance of said bridge circuit, means for supplying voltage to said input circuit to balance the voltage being measured, means for controlling the voltage supplied to said input circuit, and a meter for measuring the voltage supplied to said input circuit.

5. In an electrical measuring instrument a bridge circuit having a plurality of resistances, one of said resistances comprising a vacuum tube connected to form one resistance arm of said bridge circuit, an input circuit having an input vacuum tube connected to said bridge circuit, a null indicator for indicating the state of balance of said bridge circuit, a variable resistance connected to said bridge circuit vacuum tube for varying the tube resistance thereof to balance said bridge circuit, means including a potentiometer for supplying voltage to said input circuit to counteract the input voltage being measured, and a meter for measuring said counteracting voltage.

6. In an electrical measuring instrument, a bridge circuit having a plurality of resistances, one of said resistances comprising a vacuum tube connected to form one resistance arm of said bridge circuit, an input circuit having an input vacuum tube with a grid electrode connected to receive the input voltage and another electrode connected to the grid of said bridge circuit vacuum tube, a null indicator for indicating the state of balance of said bridge circuit, a variable resistance connected to said bridge circuit vacuum tube for varying the tube resistance thereof to balance said bridge circuit, means including a potentiometer for supplying voltage to said input circuit to counteract the input voltage being measured, and a meter for measuring said counteracting voltage.

FLOYD E. WENGER.

CERTIFICATE OF CORRECTION.

Patent No. 2,143,219.                 January 10, 1939.

FLOYD E. WENGER.

It is hereby certified that the name of the assignee in the above numbered patent was erroneously written and printed as "RAY E. TRIPLETT" whereas said name should have been written and printed as RAY L. TRIPLETT, as shown by the record of assignments in this office; and that the said Letters Patent should be read with this correction therein that the same may conform to the record of the case in the Patent Office.

Signed and sealed this 21st day of February, A. D. 1939.

(Seal)                                               Henry Van Arsdale.
                                                      Acting Commissioner of Patents.

indicator 13 again indicates zero current. The voltage impressed on the input is therefore equal to the balanced out voltage applied from the potentiometer 22 and is read by the operator directly on the linear scale meter 14.

Batteries may be used as a source of current supply, but I prefer to use rectified alternating current power supply, as shown.

It will be understood that I desire to comprehend within my invention such modifications as come within the scope of the claims and the invention.

Having thus fully described my invention, what I claim as new and desire to secure by Letters Patent, is:

1. In an electrical measuring instrument, a bridge circuit having resistance means including a vacuum tube connected to form one resistance arm of said bridge circuit, an input circuit including an input vacuum tube connected to said bridge circuit vacuum tube, a null indicator for indicating the state of balance of said bridge circuit, means for balancing said bridge circuit to balance the current being measured, and a meter for measuring the current supplied to the input circuit.

2. In an electrical measuring instrument, a bridge circuit having resistance means including a vacuum tube connected to form one resistance arm of said bridge circuit, an input circuit including an input vacuum tube having a grid arranged to receive the input current and a plate connected to said bridge circuit, a null indicator for indicating the state of balance of said bridge circuit, means for supplying current to the input circuit to balance the current being measured, and a meter for measuring the current supplied to said input circuit.

3. In an electrical measuring instrument, a bridge circuit having resistance means including a vacuum tube connected to form one resistance arm of said bridge circuit, an input circuit including an input grid-controlled vacuum tube having an electrode thereof connected to an electrode of said bridge circuit vacuum tube and another electrode connected to said bridge circuit, a null indicator for indicating the state of balance of said bridge circuit, means for supplying current to said input circuit to balance the current being measured, and a meter for measuring the current supplied to said input circuit.

4. In an electrical measuring instrument, a bridge circuit having resistance means including a vacuum tube connected to form one resistance arm of said bridge circuit, an input circuit including an input vacuum tube having a grid arranged to receive the input potential, a plate connected to said bridge circuit and a cathode connected to the grid of said bridge circuit vacuum tube, a null indicator for indicating the state of balance of said bridge circuit, means for supplying voltage to said input circuit to balance the voltage being measured, means for controlling the voltage supplied to said input circuit, and a meter for measuring the voltage supplied to said input circuit.

5. In an electrical measuring instrument a bridge circuit having a plurality of resistances, one of said resistances comprising a vacuum tube connected to form one resistance arm of said bridge circuit, an input circuit having an input vacuum tube connected to said bridge circuit, a null indicator for indicating the state of balance of said bridge circuit, a variable resistance connected to said bridge circuit vacuum tube for varying the tube resistance thereof to balance said bridge circuit, means including a potentiometer for supplying voltage to said input circuit to counteract the input voltage being measured, and a meter for measuring said counteracting voltage.

6. In an electrical measuring instrument, a bridge circuit having a plurality of resistances, one of said resistances comprising a vacuum tube connected to form one resistance arm of said bridge circuit, an input circuit having an input vacuum tube with a grid electrode connected to receive the input voltage and another electrode connected to the grid of said bridge circuit vacuum tube, a null indicator for indicating the state of balance of said bridge circuit, a variable resistance connected to said bridge circuit vacuum tube for varying the tube resistance thereof to balance said bridge circuit, means including a potentiometer for supplying voltage to said input circuit to counteract the input voltage being measured, and a meter for measuring said counteracting voltage.

FLOYD E. WENGER.

CERTIFICATE OF CORRECTION.

Patent No. 2,143,219. January 10, 1939.

FLOYD E. WENGER.

It is hereby certified that the name of the assignee in the above numbered patent was erroneously written and printed as "RAY E. TRIPLETT" whereas said name should have been written and printed as RAY L. TRIPLETT, as shown by the record of assignments in this office; and that the said Letters Patent should be read with this correction therein that the same may conform to the record of the case in the Patent Office.

Signed and sealed this 21st day of February, A. D. 1939.

(Seal)

Henry Van Arsdale.
Acting Commissioner of Patents.